July 31, 1962
G. L. GROVE
3,046,703
REGULATING WHEEL SPINDLE MOUNTING AND DRIVE
FOR A CENTERLESS GRINDING MACHINE
Filed Sept. 21, 1959
4 Sheets-Sheet 4
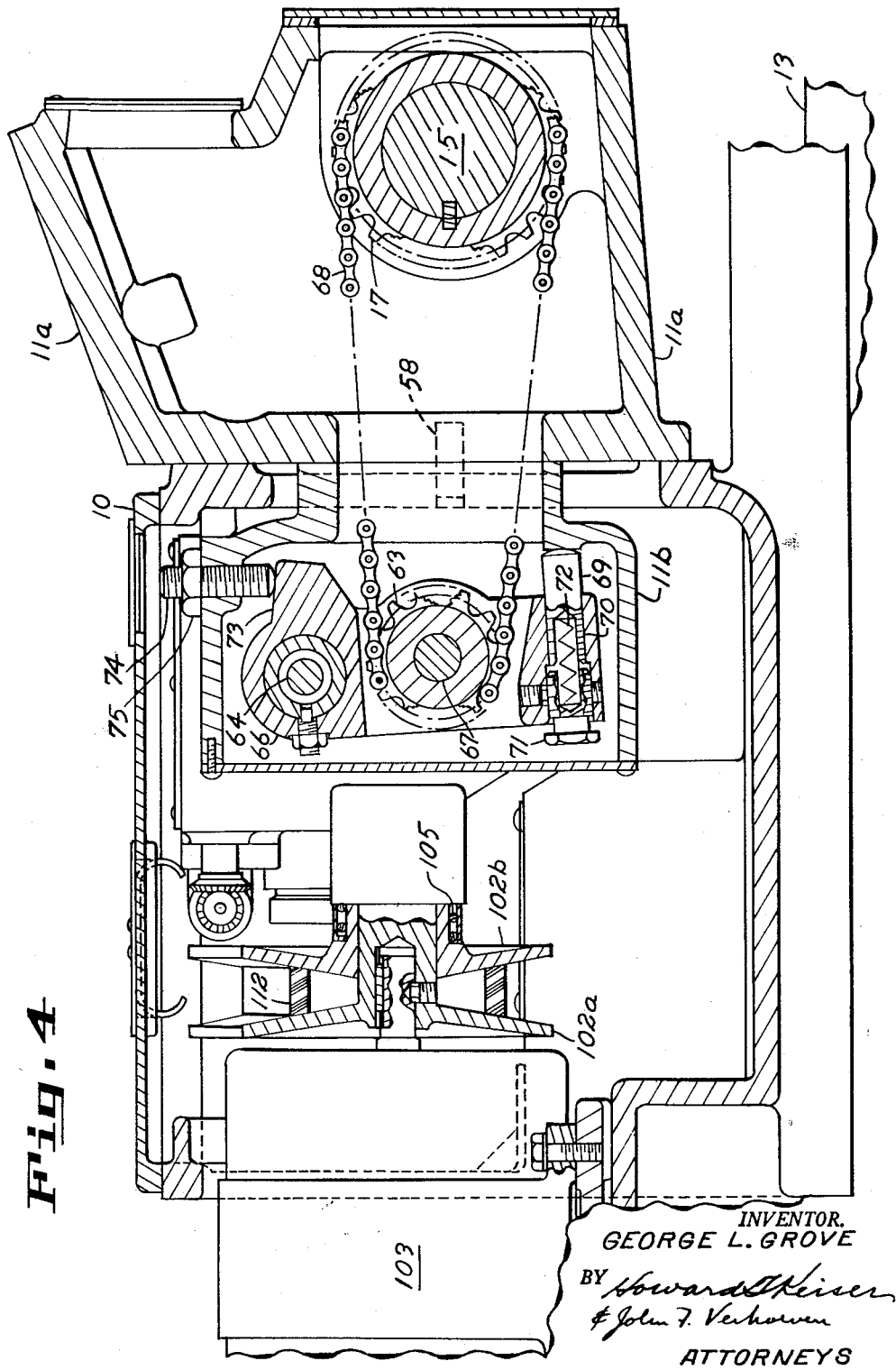
INVENTOR.
GEORGE L. GROVE
BY Howard Keiser
& John F. Verhoeven
ATTORNEYS

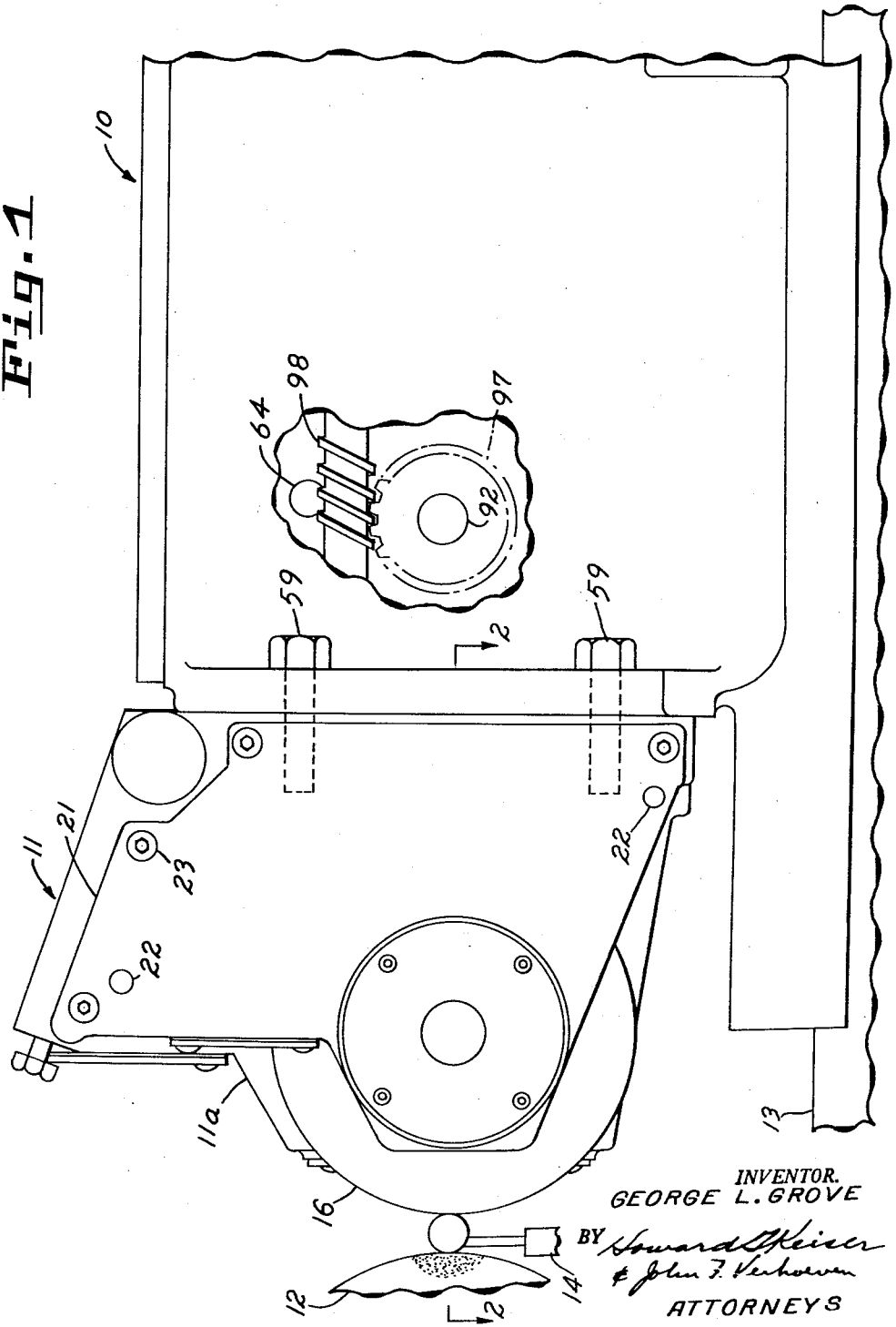

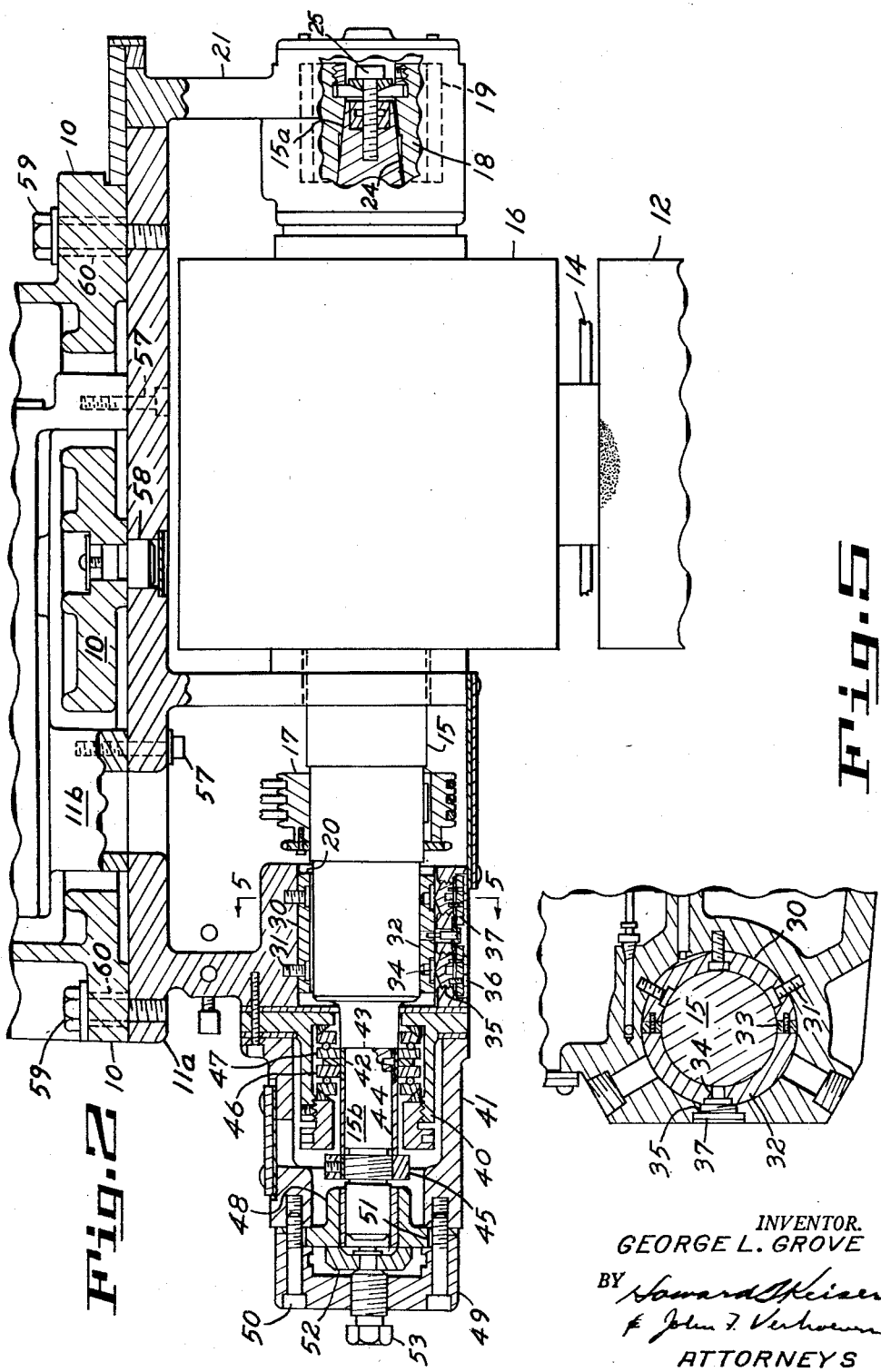

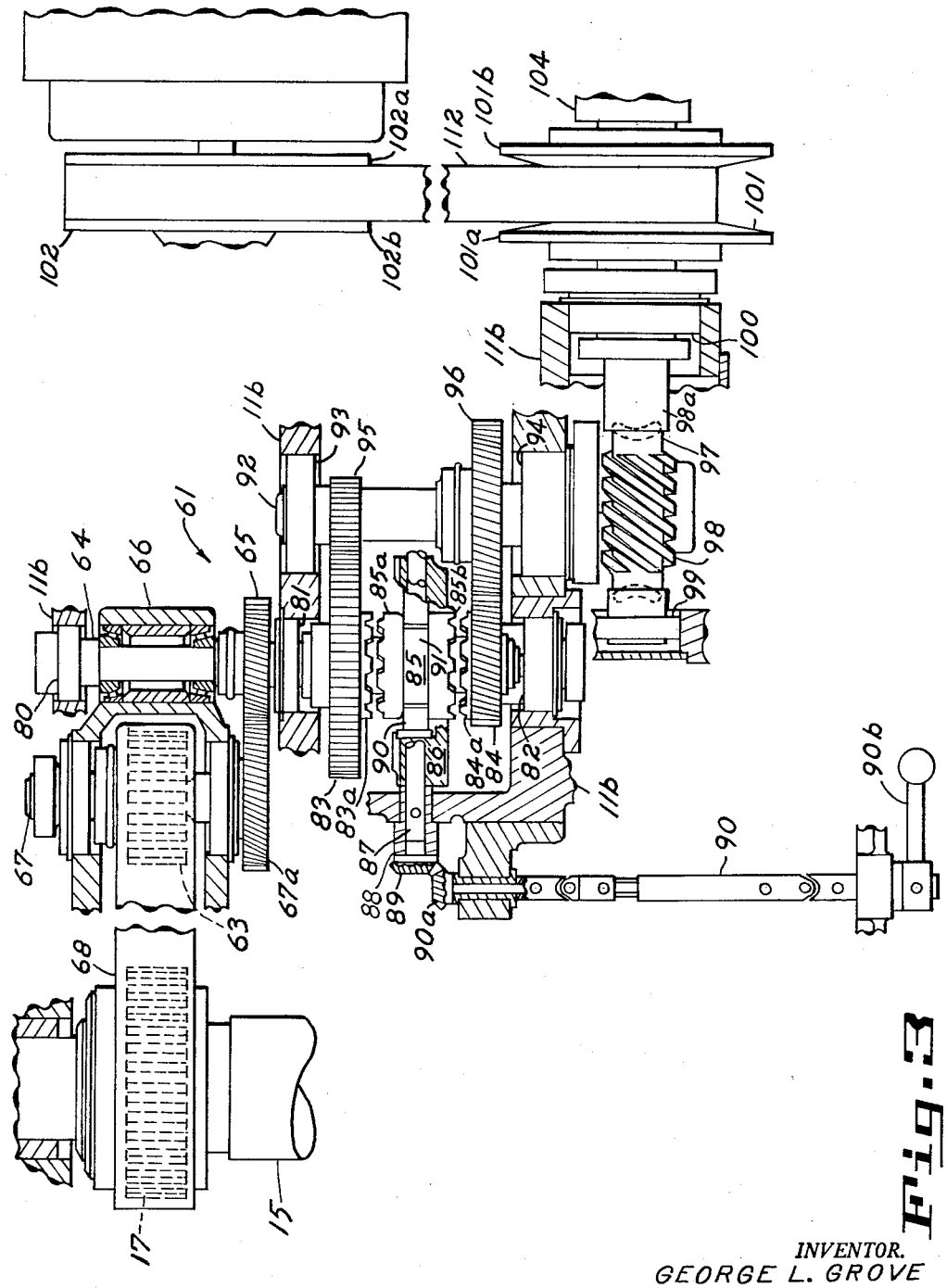

United States Patent Office 3,046,703
Patented July 31, 1962

3,046,703
REGULATING WHEEL SPINDLE MOUNTING AND DRIVE FOR A CENTERLESS GRINDING MACHINE
George L. Grove, Cincinnati, Ohio, assignor to The Cincinnati Milling Machine Co., Cincinnati, Ohio, a corporation of Ohio
Filed Sept. 21, 1959, Ser. No. 841,393
7 Claims. (Cl. 51—103)

The present invention relates to a spindle mounting and drive construction for the regulating wheel of a centerless grinding machine.

In a centerless grinding machine a workpiece of circular cross-section is supported on a blade between a rotating grinding wheel and a regulating wheel, the latter being driven at a slower speed than the grinding wheel and serving as a frictional driving element rotating the work at a constant and uniform surface speed approximately equal to that of the regulating wheel. It is important in precision grinding that the workpiece engaging surface of the regulating wheel be in precise desired relation to the workpiece engaging surface of the grinding wheel. For example, in infeed grinding of cylindrical workpieces, it is necessary that the surface of the regulating wheel be maintained in parallel relationship to the surface of the grinding wheel as the regulating wheel and workpiece are fed into the grinding wheel to avoid an undesired taper on the workpiece.

There is inevitably a small amount of play in the regulating wheel spindle bearings which can result in the regulating wheel spindle being tilted in a horizontal plane when the driving force is applied to the spindle and the regulating wheel is engaged with the workpiece during grinding, thereby affecting the parallel relationship of the workpiece engaging surfaces of the wheels required for grinding true cylindrical conformations. In the present invention the regulating wheel spindle is preloaded in the bearings in a manner to prevent tilting, or cocking, of the spindle upon application of these forces to the spindle. In the preferred form of the present invention the regulating wheel spindle drive sprocket and the regulating wheel are located inboard of the spindle bearings and tension is maintained in the drive chain which drives the sprocket. Both the force imparted to the regulating wheel by engagement with the workpiece during grinding, and the force transmitted through the driving chain under tension, urge the spindle against the back of both bearings. Moreover, the force applied to the spindle constantly through the chain preloads the spindle in this position in the bearings so that, on application of the force imparted to the spindle through the workpiece when grinding is begun, the spindle is neither shifted nor tilted in the horizontal plane from the preloaded position thereof. It is therefore an object of the present invention to provide a preloaded regulating wheel spindle which is not substantially shifted or tilted on application of the grinding force thereto.

In order to preload the spindle, the drive chain is received on a sprocket which is swingably mounted on a driven shaft of the transmission and operatively connected thereto, said swingable sprocket being urged away from the spindle by a spring urged plunger engaged with the regulating wheel housing. The transmission, including said shaft, is mounted in the regulating wheel housing so that when the housing, which is pivotally mounted, is tilted to tilt the regulating wheel about a horizontal axis parallel to the plane of the grinding wheel to impart an axial force to a workpiece for thrufeed grinding, the spindle loading driving connection from the transmission shaft will not be affected. It is therefore another object of the present invention to provide a driving connection from the regulating wheel transmission to the regulating wheel spindle which will preload the spindle and which will not be affected by tilting of the regulating wheel housing.

It is believed that one cause of surface blemishes in a finished workpiece stems from fluctuations in the speed of the regulating wheel during grinding. Irregularties in the workpiece being ground may cause a jerking of the regulating wheel and, to eliminate this, in the preferred form of the drive mechanism of the present invention there is provided, in addition to the positive acting chain drive through which the spindle is preloaded, an irreversible worm and worm wheel between said driven transmission shaft and the motor to prevent the regulating wheel from rotating, at any time, faster than it is driven by the motor. It is therefore another object of the present invention to provide an effective, positive acting, controlled drive for the regulating wheel spindle through which said spindle is preloaded in its bearings.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 1 is a fragmentary elevational view of a centerless grinding machine;

FIG. 2 is a view taken on line 2—2 of FIG. 1;

FIG. 3 is a somewhat schematic view of the drive transmission with many of the parts rotated out of position for clarity;

FIG. 4 is a cross-sectional view taken in the opposite direction from the view of FIG. 1; and FIG. 5 is a view taken on line 5—5 of FIG. 2.

The upper slide 10 and regulating wheel housing 11 of a centerless grinding machine of the type shown, for example, in U.S. Patent 2,855,729, is shown in FIG. 1. The grinding wheel 12 is mounted on a base (not shown) and an angularly adjustable slide, or swivel plate (not shown) is pivotally connected to the base in front of the grinding wheel, the swivel plate carrying a lower slide 13 for movement towards and away from the grinding wheel. The lower slide carries a workpiece support 14, at the end adjacent the grinding wheel, and the upper slide 10 which is adjustably movable on the lower slide towards and away from the workpiece support 14. The regulating wheel housing is pivotally mounted to the upper slide and has a portion 11a extending forwardly from the upper slide toward the grinding wheel 12 and a rear portion 11b received within the upper slide.

As shown in FIG. 2, a spindle 15 is rotatably mounted in the forward portion 11a of the regulating wheel housing and has mounted thereon a regulating wheel 16 and a drive sprocket 17. The spindle, at one end, has a tapered portion 15a to which a sleeve 18 is keyed at 24 and clamped by bolt 25; at the opposite end the spindle has a reduced portion 15b. The spindle is supported by a pair of like bearings 19 and 20 which straddle both the regulating wheel 16 and sprocket 17. The bearing 19 is mounted in a detachable side portion 21 of the forward portion 11a of the housing and receives the sleeve 18 which is keyed on the spindle. The side portion 21 is located on the housing by pins 22 and secured thereto by bolts 23. The bearing 20 is also mounted in the housing and receives the spindle adjacent the reduced portion 15b thereof.

Each bearing is split, having a rear portion 30 rigidly secured in the housing by screws 31 and having a forward portion 32 adjustable in the housing, the bearing portions being separated by felt strips 33. The forward bearing portions 32 have pins 34 engaged by screws 35 threadedly received in the housing, the screws 35 being locked in adjusted position by the tightening of screws 36 which connect screws 35 with a disc 37 received in a counterbore in the housing and spaced from the screws 35. Although the adjustment of the bearing portions 32 reduces the play in the bearings, if proper sliding rotation is to be maintained the bearings cannot be tightened to preclude all yielding of the spindle in the bearings on application of forces to the spindle during grinding.

An inner sleeve 40 and an outer sleeve 41 are connected to the regulating wheel housing over the reduced portion 15b of the spindle. A flanged sleeve 42 is clamped against shoulder 43 of the spindle portion 15b by sleeve 44 and collar 45. The flange of sleeve 42 is wedged between thrust bearings 46 and 47 held in the inner sleeve 40 to prevent axial shifting of the spindle 15. Outboard of collar 45, a third bearing 48 is received on the spindle and is loosely received between the outer sleeve 41 and a cap 49 secured thereto by bolts 50, the bolts 50 passing through slots 51 in the bearing. The outer end of bearing 48 is in registration with a clamp member 52 threadedly supported by cap 49 and terminating in head 53 outside cap 49. Normally, the bearing member 48 floats relative to the housing and affords no bearing support to the spindle but when it is desired to remove the regulating wheel, and removal of housing portion 21 with the bearing 19 becomes necessary, the bearing 48 is clamped against the outer sleeve 41 to support the spindle so that bearing 19 can be removed without disturbing the spindle. Since bearing 48 normally floats it need not be prealigned with bearings 19 and 20.

The rear portion 11b of the regulating wheel housing is rigidly connected to the forward portion 11a by bolts 57 and the entire housing is pivotally connected to the upper slide by pivot pin 58 and clamped thereto in desired angular relation by bolts 59 threadedly received in the forward portion of the housing and passing through slots 60 in the upper slide.

Mounted in the rear portion 11b of the housing and pivoted therewith relative to the upper slide is a transmission indicated generally at 61 and shown somewhat schematically in FIG. 3 with many of the parts thereof shown rotated out of their true position for clarity. The transmission 61 has a driven shaft 64 parallel to spindle 15 on which a gear 65 is pinned. Also on shaft 64 there is swingably mounted a bracket 66 having a shaft 67 parallel to shaft 64. Integral with shaft 67 is a gear 67a engaged with gear 65. Sprocket 63 is pinned to the shaft 67 in alignment with the sprocket 17 on the spindle.

Sprocket 63 is connected by endless band, or chain 68 with spindle sprocket 17. As shown best in FIG. 4, a slidable plunger 69 is received in one end of a bore 70 in the bracket 66 below sprocket 63 and on the side thereof opposite the shaft 64 on which the bracket is pivoted. In the opposite end of bore 70 there is a threaded plug 71 and the plug and plunger have internal blind bores receiving the opposite ends of spring 72. The outer end of the plunger engages the regulating wheel housing so that the sprocket is urged rearwardly away from the spindle 15 by spring 72, the force applied to the sprocket 63 being adjustable by adjustment of plug 71. The force applied to the sprocket 63 acts through both the slack and driven side of the chain 68 and produces a firm preloading force on the spindle to hold the spindle against the back of both bearings. The pulley bracket 66 has a surface 73 spaced from the shaft 64 about which it pivots and in registration with bolt 74 received in the housing. After the spindle is preloaded with the desired force by adjustment of plug 71 the bolt 74 is brought down into engagement with surface 73 and locked in the adjusted position with nut 75 to rigidly hold the bracket sprocket in its preloaded position. It will be noted that with this construction a substantial amount of the force applied to the spindle through the chain is taken up by the regulating wheel housing.

As shown in FIG. 3, the shaft 64 is rotatably supported in the rear portion 11b of the housing at 80, 81 and 82, and loosely receives thereon a pair of spaced gears 83 and 84, of different size, having teeth 83a and 84a on their faces. Keyed to shaft 64 between gears 83 and 84, and axially shiftable thereon, is a clutch member 85 having teeth 85a and 85b at each end. A shifter member 86 is mounted on shaft 87 which is pinned in sleeve 88. The sleeve 88 is journaled in the housing and terminates in a beveled gear 89. The shifter member has fingers 90' which are spaced from shaft 87 and engage groove 91 of clutch member 85 so that when shaft 87 is rotated in one direction the clutch member is shifted in one direction on the shaft 64 and one set of teeth thereof, say 85a, engage the teeth of gear 83; and when shaft 87 is rotated in the opposite direction the shifter is shifted in the opposite direction on shaft 64, the teeth 85b engaging the teeth of gear 84. The shaft 87 is rotated by a shaft 90 having at one end a bevel gear 90a engaged with gear 89 and at the opposite end a lever 90b. Since the clutch member 85 is keyed to the shaft 64 engagement of the clutch member with one or the other of said gears causes rotation of shaft 64 at the speed of rotation of the gear the clutch member is engaged with.

A shaft 92 is rotatably mounted in the housing at 93 and 94 and has gears 95 and 96 fast thereon for rotation therewith, the gears 95 and 96 engaged respectively with gears 83 and 84. Shaft 92 has at one end a worm wheel 97 engaged with worm 98. The worm 98 is mounted on a shaft 98a rotatably supported in the housing at 99 and 100, the shaft 98a having connected thereto at one end, outside the housing, a sheave 101. Sheave 101 lies in a plane normal to the axis of pivot of the regulating wheel housing 11 about pin 58 and in alignment with sheave 102 carried on the shaft of motor 103 which is mounted in the upper slide 10. Sheaves 101 and 102 consist of spaced flanges 101a, 101b and 102a, 102b having inclined inner sides. The outer flange 101b and 102b of each sheave are slidably received on their shafts relative to the inner flange. The outer flange 102b is urged toward the inner flange 102a by spring 105 mounted on the motor shaft. The position of flange 101b relative to flange 101a is adjusted by a variable speed mechanism having an adjustably shiftable member 104 engaged with flange 101b.

The sheaves are connected by belt 112 and, by shifting the outer flange 101b toward flange 101a, the belt is forced outwardly on sheave 101, spreading the flanges of sheave 102 so that the belt shifts inwardly on that sheave, thereby changing the effective radii of the respective sheaves and altering the speed ratio between said sheaves. When the housing 11 and transmission 61 is tilted, the sheave 101 remains in the plane of sheave 102 and, if the sheave 101 is not on the axis of pivot pin 58, the sheave 102 accommodates itself to the changed distance between the sheaves. If this alters the speed of the regulating wheel spindle beyond desired limits the speed can be easily adjusted by shifting of member 104.

What is claimed is:

1. In a centerless grinding machine having a grinding wheel, a regulating wheel housing mounted opposite the grinding wheel, a pair of spaced aligned bearings mounted in said housing, a spindle rotatably supported by said bearings, a regulating wheel mounted on said spindle between the bearings, and means operatively engaged with said spindle between said bearings to preload the spindle in the bearings away from the grinding wheel to prevent cocking of the spindle in the bearings as force is applied to the regulating wheel during grinding.

2. In a grinding machine having a grinding wheel, a regulating wheel housing opposite the grinding wheel, a pair of spaced aligned bearings mounted in said housing, a spindle rotatably supported by said bearings, a regulating wheel mounted on said spindle between the bearings and adapted to engage a workpiece received between the grinding wheel and the regulating wheel for grinding, driving means operatively connected to the spindle between said bearings, and means acting through said driving means to urge the spindle away from the grinding wheel to take up play in the bearings and eliminate cocking of the spindle in the bearings as the workpiece is brought into abrading contact with the grinding wheel.

3. In a grinding machine having a grinding wheel, a housing opposite the grinding wheel, a spindle, a regulating wheel mounted on the spindle adapted to engage a workpiece and hold the same in grinding engagement with the grinding wheel, a pair of bearing members mounted in the housing to rotatably support the spindle in straddling relation to the regulating wheel, a flexible endless band engaged with said spindle between the bearings to drive the spindle, and means constantly to pull said band away from the grinding wheel to preload the spindle and take up play in said bearings for eliminating cocking of the spindle in the bearings on application of a grinding force to the workpiece.

4. In a grinding machine having a grinding wheel, a housing opposite the grinding wheel, a spindle, a regulating wheel mounted on the spindle adapted to engage a workpiece and hold the same in grinding engagement with the grinding wheel, a pair of bearing members mounted in the housing to rotatably support the spindle in straddling relation to the regulating wheel, a flexible endless band engaged with said spindle between the bearings, a shaft mounted in the regulating wheel housing behind the spindle, a bracket swingably mounted on the shaft having means operatively connected to the shaft to receive the endless band, means to urge said bracket away from said spindle to preload said spindle into the back of both bearings, and means to drive said shaft to drive the spindle and regulating wheel thereon and away from the grinding wheel to eliminate cocking of the spindle in the bearings when the workpiece engages the grinding wheel.

5. In a grinding machine having a grinding wheel, a housing opposite the grinding wheel, a spindle, a regulating wheel mounted on the spindle adapted to engage a workpiece and hold the same in grinding engagement with the grinding wheel, a sprocket mounted on the spindle, a pair of bearing members mounted in the housing to receive the spindle in straddling relation to the regulating wheel and spindle sprocket, a shaft mounted in the regulating wheel housing parallel to the spindle on the side thereof away from the grinding wheel, said shaft having a first gear thereon, a bracket swingably mounted on the shaft having a second gear rotatably carried thereby engaged with said first gear, said bracket having a sprocket rotatably carried thereby and operatively connected to said second gear, an endless chain connecting said bracket sprocket and said spindle sprocket, a spring-urged plunger mounted in the bracket and engaged with the housing to urge said bracket pulley away from the spindle to preload the spindle in the bearings away from the grinding wheel for elimination of cocking of the spindle in the bearings when the workpiece engages the grinding wheel, a motor, and means connecting said motor to said shaft.

6. In a grinding machine having a grinding wheel, a housing opposite the grinding wheel, a pair of spaced bearings mounted in the housing, one of said bearings being fixed therein and the other being detachable therefrom, a spindle rotatably mounted in the bearings, a regulating wheel mounted on the spindle between said bearings adapted to engage a workpiece and hold the same in grinding engagement with the grinding wheel, a third bearing mounted on the spindle on the opposite side of the regulating wheel to said detachable bearing and loosely received in the housing, said third bearing offering no support to the spindle and requiring no alignment with the other bearings when loose, a clamp selectively operable to secure said third bearing in the housing and hold the spindle on said axis together with said fixed bearing when said detachable bearing is removed for removal of the regulating wheel, an endless chain defining a loop in driving engagement with the spindle between said bearings, a shaft mounted in the regulating wheel housing parallel to the spindle on the side thereof away from the grinding wheel, a bracket swingably mounted on the shaft having means spaced from the shaft and operatively connected thereto to receive both sides of the chain loop directly from the spindle, means to urge said bracket away from said grinding wheel to preload said spindle in both bearings away from the grinding wheel and thereby prevent cocking of the spindle in the bearings on application of a grinding force to the workpiece, and means to drive said shaft to drive the spindle and regulating wheel thereon.

7. In a grinding machine having a base and having a grinding wheel mounted on the base, a housing, a pair of spaced bearings mounted in the housing, a spindle rotatably mounted in the bearings and having a sprocket between the bearings, a regulating wheel mounted on the spindle, means to mount the housing on the base opposite the grinding wheel, said housing pivotal to permit selective tilting of the regulating wheel relative to the grinding wheel, an endless band defining a loop received on the spindle sprocket, a shaft mounted in the regulating wheel housing parallel to and behind the spindle for tilting therewith, a bracket mounted on the shaft and swingable thereon in the plane of the spindle sprocket, said bracket having a sprocket spaced from the shaft and operatively connected thereto for rotation thereby, said sprocket receiving both sides of the chain loop directly from the spindle, means acting between the housing and the bracket to urge said bracket away from said grinding wheel to preload said spindle in both bearings away from the grinding wheel, and means to drive said shaft to drive the spindle and regulating wheel thereon.

References Cited in the file of this patent
UNITED STATES PATENTS

| | | |
|---|---|---|
| 1,917,468 | Steiner et al. | July 11, 1933 |
| 1,965,235 | Haas | July 3, 1934 |
| 1,979,146 | Davey | Oct. 30, 1934 |
| 2,507,372 | Emmons | May 9, 1950 |
| 2,719,064 | Barnard | Sept. 27, 1955 |
| 2,834,159 | Hill | May 13, 1958 |

UNITED STATES PATENT OFFICE
CERTIFICATE OF CORRECTION

Patent No. 3,046,703

July 31, 1962

George L. Grove

It is hereby certified that error appears in the above numbered patent requiring correction and that the said Letters Patent should read as corrected below.

Column 5, lines 39 to 42, strike out "and away from the grinding wheel to eliminate cocking of the spindle in the bearings when the workpiece engages the grinding wheel" and insert the same after "bearings" in line 38, same column 5.

Signed and sealed this 1st day of January 1963.

(SEAL)
Attest:

ERNEST W. SWIDER
Attesting Officer

DAVID L. LADD
Commissioner of Patents